(12) United States Patent
McDaniel et al.

(10) Patent No.: US 11,027,476 B2
(45) Date of Patent: Jun. 8, 2021

(54) MULTIPLE SCREW EXTRUDER IMPLEMENTED WITH VACUUM VENT AND SCREWS CONFIGURED TO DENSIFY, OR EXTRACT FLUID FROM, MATERIAL PROCESSED BY THE EXTRUDER

(71) Applicant: ENTEK MANUFACTURING LLC, Lebanon, OR (US)

(72) Inventors: Colt Aaron McDaniel, Lebanon, OR (US); Dean Justin Elliott, Albany, OR (US); Craig Allen Benjamin, Lebanon, OR (US)

(73) Assignee: Entek Manufacturing LLC, Lebanon, OR (US)

( * ) Notice: Subject to any disclaimer, the term of this patent is extended or adjusted under 35 U.S.C. 154(b) by 0 days.

(21) Appl. No.: 16/605,477

(22) PCT Filed: Mar. 26, 2019

(86) PCT No.: PCT/US2019/024059
§ 371 (c)(1),
(2) Date: Oct. 15, 2019

(87) PCT Pub. No.: WO2019/191085
PCT Pub. Date: Oct. 3, 2019

(65) Prior Publication Data
US 2020/0047390 A1 Feb. 13, 2020

Related U.S. Application Data

(60) Provisional application No. 62/649,845, filed on Mar. 29, 2018.

(51) Int. Cl.
*B29C 48/40* (2019.01)
*B29C 48/76* (2019.01)
(Continued)

(52) U.S. Cl.
CPC ............ *B29C 48/40* (2019.02); *B29C 48/505* (2019.02); *B29C 48/68* (2019.02); *B29C 48/69* (2019.02); *B29C 48/767* (2019.02); *C08J 3/20* (2013.01)

(58) Field of Classification Search
CPC ..... B29C 48/40; B29C 48/767; B29C 48/505; B29C 48/68; B29C 44/3449; B29C 45/47;
(Continued)

(56) References Cited

U.S. PATENT DOCUMENTS 4,992,222 A 2/1991 Banevicius et al.
5,932,159 A 8/1999 Rauwendaal
(Continued)

FOREIGN PATENT DOCUMENTS

WO 2018027006 A1 2/2018

*Primary Examiner* — Stella K Yi
(74) *Attorney, Agent, or Firm* — Stoel Rives LLP (57) ABSTRACT

A multiple screw extruder (50) combines application of vacuum to a vacuum vent (62) positioned between material feed locations (70, 72) of the extruder and use of specially configured extruder screws (58) to extract gases, primarily air, out of the extruder to densify the materials introduced into it and to extract unwanted fluid from material introduced for mixture with molten polymeric material flowing through the extruder. The multiple screw extruder is operationally versatile in that it is capable of carrying out the material densification and fluid extraction processes either separately or simultaneously. Implementation of the disclosed vacuum feed technology provides an increase in rate of extrudate throughput as compared with that achievable by implementation of atmospheric venting (16) in a conventionally configured extruder (10a, 10b).

31 Claims, 7 Drawing Sheets

(51) Int. Cl.
*B29C 48/69* (2019.01)
*B29C 48/505* (2019.01)
*B29C 48/68* (2019.01)
*C08J 3/20* (2006.01)

(58) Field of Classification Search
CPC ......... B29C 45/48; B29C 48/38; B29C 48/39; B29C 48/41; B29C 48/425; B29C 48/445; B29C 48/455; B29C 48/501; B29C 48/683; B29C 48/765; B29C 48/766; C08J 3/20

See application file for complete search history.

(56) References Cited

U.S. PATENT DOCUMENTS

| | | |
|---|---|---|
| 6,170,975 B1 | 1/2001 | Andersen |
| 6,583,261 B2 | 6/2003 | Bandera et al. |
| 8,360,627 B2 | 1/2013 | Stirner |
| 2004/0209977 A1 | 10/2004 | Hossan |
| 2008/0262196 A1 | 10/2008 | Giammattei et al. |
| 2012/0235090 A1* | 9/2012 | Maeda .................... B29B 7/845 252/299.6 |
| 2015/0001045 A1 | 1/2015 | Shimizu et al. |

* cited by examiner

MULTIPLE SCREW EXTRUDER IMPLEMENTED WITH VACUUM VENT AND SCREWS CONFIGURED TO DENSIFY, OR EXTRACT FLUID FROM, MATERIAL PROCESSED BY THE EXTRUDER

RELATED APPLICATION

This application claims benefit of U.S. Patent Application No. 62/649,845, filed Mar. 29, 2018.

COPYRIGHT NOTICE

© 2019 Entek Manufacturing LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates to multiple screw extruders and, in particular, to such an extruder to which vacuum is applied to densify material introduced into or to extract fluid from the extruder, or both.

BACKGROUND INFORMATION

Figure 1A:
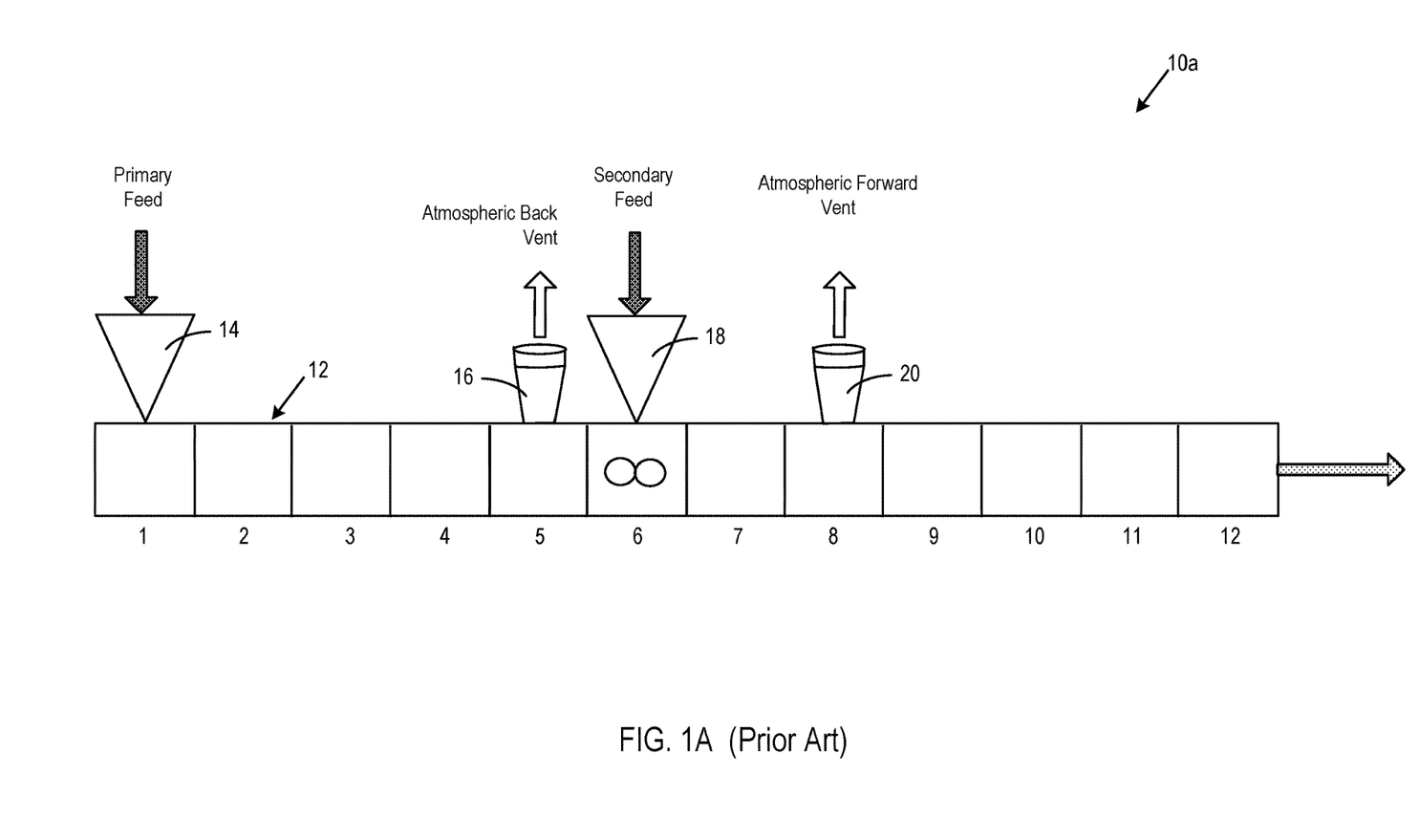
FIG. 1A is a simplified diagram of a thermally controlled conventionally configured multiple screw extruder that is constructed with an atmospheric back vent and an atmospheric forward vent to allow moisture, air, and other gases accompanying particulate material introduced at a secondary feed to escape from the extruder barrel.

FIG. 1A shows a thermally controlled multiple screw extruder 10a conventionally configured with a barrel 12 that includes concatenated barrel segments 1-12. At least one polymeric material is introduced into extruder 10a at barrel segment 1 through an opening for a primary feed 14. Extruder screws (not shown) rotating in barrel 12 form molten polymer from the polymeric material introduced at barrel segment 1. Extruder 10a is constructed with an opening for an atmospheric back vent 16. The opening for atmospheric back vent 16 is located at barrel segment 5. Barrel segment 5 is adjacent to and upstream of barrel segment 6, which has an opening for a secondary feed 18 so that moisture, air or other gases accompanying particulate filler material introduced at the opening for secondary feed 18 can escape through atmospheric back vent 16 to slightly densify the particulate filler material. Each of the extruder screws has a section located between the opening for back vent 16 and the opening for secondary feed 18 that is configured such that the molten polymer and other material moving through extruder 10a do not completely fill a free volume in the space between the screws and interior surface of the barrel so as to not form a dynamic seal. A dynamic seal is a dam or plug of flowing polymeric material that is continuously replenished by new material entering and exiting an internal extruder zone.

In certain conventionally configured extruders, a second, atmospheric forward vent 20 located at barrel segment 8 downstream of the opening for secondary feed 18 allows the escape of air accompanying the particulate filler material introduced at the opening for secondary feed 18. The escape of air through atmospheric vent 20 results in moderate densification of the particulate filler material introduced. Extruder screw sections located between the openings for secondary feed 18 and atmospheric forward vent 20 are configured such that the molten polymer and other material moving through extruder 10a do not completely fill the free volume between the extruder screws and interior surface of the barrel so as to not form a dynamic seal.

Figure 1B:
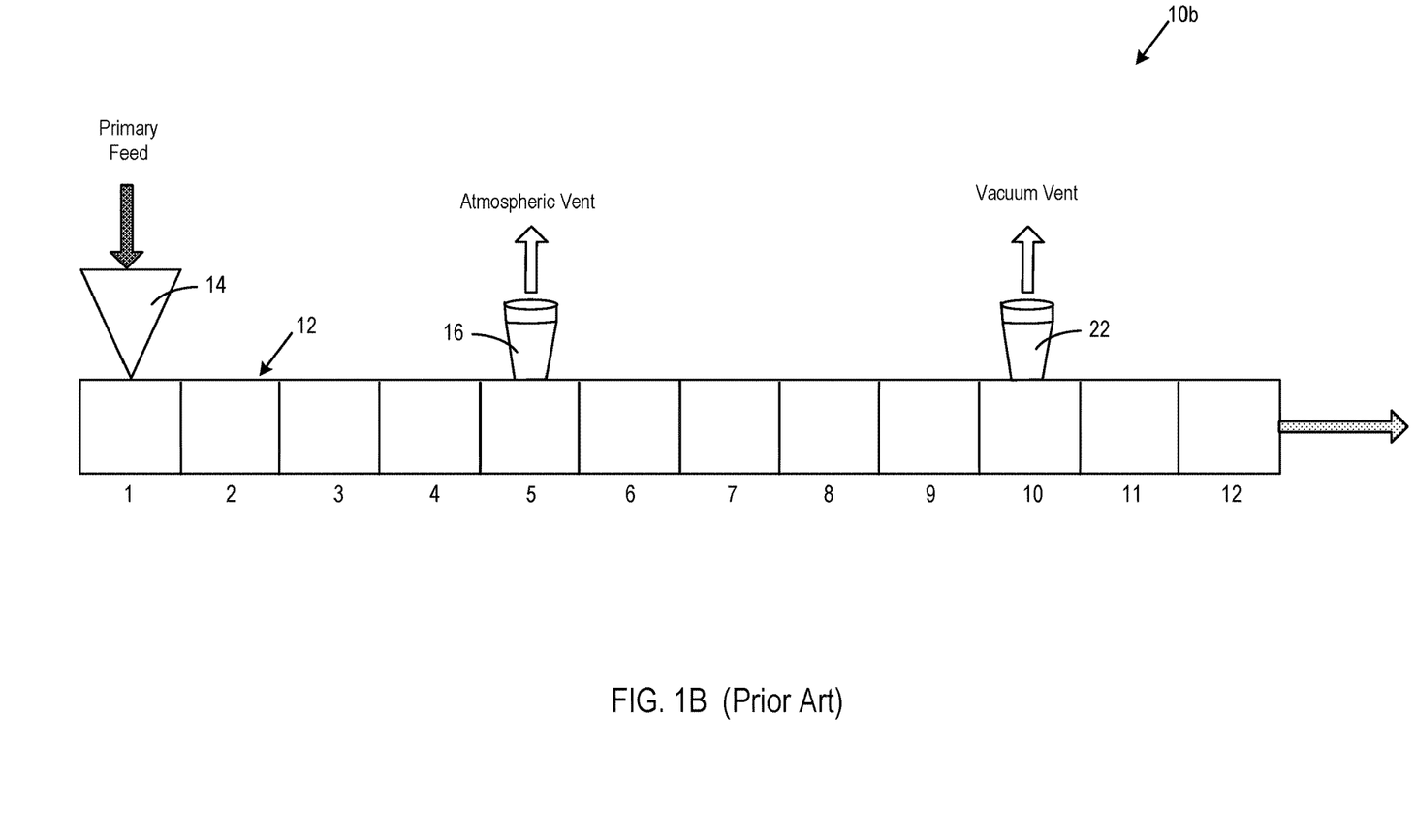
FIG. 1B is a simplified diagram of a thermally controlled conventionally configured multiple screw extruder that is constructed with an atmospheric vent and a downstream vacuum vent to remove moisture from polymeric and other materials flowing through the extruder barrel.

FIG. 1B shows a thermally controlled multiple screw extruder 10b that, except as characterized below, is conventionally configured in the manner described for multiple screw extruder 10a of FIG. 1A. Common components and features of extruders 10a and 10b share the same reference numerals. Extruder 10b exemplifies placement of atmospheric vent 16 and a downstream vacuum vent 22 to remove moisture from polymers and material introduced through the opening for primary feed 14. Atmospheric vent 16 is placed at barrel segment 5, where polymeric material flowing through barrel 12 is not completely melted and there is no dynamic seal. Atmospheric vent 16 also allows gases produced by initial melting of the polymeric material introduced at barrel segment 1 to escape from extruder 10b and escape of moisture content from the polymeric material before it melts to an extent that would result in hydrolysis of the molten polymer as it advances along the length of extruder 10b. Vacuum vent 22 is placed downstream at barrel segment 10, and dynamic seals on either side of vacuum vent 22 promote strong vacuum for removal of unwanted fluid.

There are other extruders designed to densify material processed by a multiple screw extruder. U.S. Pat. No. 8,360,627 of Coperion GmbH describes an extruder that applies a vacuum to the inside of an extruder barrel or to an attached feed device through a sintered metal filter located on the inside surface of the barrel to densify materials introduced into the extruder. U.S. Patent Application Pub. No. US 2015/0001045 of The Japan Steel Works, LTD describes a side feeder deaeration system in which vacuum is applied directly to a feed device attached to an opening on the side of an extruder to densify materials in the side feeder.

SUMMARY OF THE DISCLOSURE

The disclosed multiple screw extruder combines application of vacuum to a vacuum vent positioned between material feed locations of the extruder and use of specially configured extruder screws to extract gases, primarily air, out of the extruder to densify the materials introduced into it and to extract unwanted fluid from material introduced for mixture with molten polymeric material flowing through the extruder. The disclosed multiple screw extruder is operationally versatile in that it is capable of carrying out the material densification and fluid extraction processes either separately or simultaneously.

In a preferred embodiment, the disclosed multiple-screw extruder is implemented with a vacuum vent that is positioned between spaced-apart material feed locations of an extruder barrel to facilitate densification of material introduced into a material feed location that is downstream of the vacuum vent, extraction of unwanted fluid from material introduced into the extruder, or both. The extruder comprises a thermally controlled extruder barrel that includes multiple concatenated barrel segments defining a longitudinal axis and an interior of the extruder barrel through which multiple axially spaced-apart extruder screws extend. The interior of the extruder barrel has an interior surface. A first feed location associated with a first opening is formed in a first barrel segment of the multiple concatenated barrel segments, and a second feed location associated with a second opening is formed in a second barrel segment of the multiple concatenated barrel segments. The second barrel segment is positioned downstream of the first barrel segment.

A vacuum vent associated with a vent opening is formed in a third barrel segment of the multiple concatenated barrel segments and is positioned between the first and second feed locations. The vacuum vent is configured to apply vacuum to the vent opening in the third barrel segment for passage through the vacuum vent to a free volume between the interior surface of the extruder barrel and a section of each of the multiple extruder screws. The sections of the multiple extruder screws function as a filter zone, and each section of the multiple extruder screws of the filter zone has lengthwise mixing elements located between the vacuum vent and the second opening associated with the second feed location. The mixing elements of the filter zone are configured to allow polymeric material introduced at the first feed location to flow as molten polymeric material through the filter zone along the longitudinal axis of the extruder barrel and to capture material introduced at the second feed location so as to prevent the vacuum from drawing through the vacuum vent an appreciable amount of the material. The mixing elements of the filter zone are configured to prevent the flow of molten polymeric material from completely filling the free volume between the extruder screws and the interior surface of the extruder barrel so as not to form a dynamic seal and thereby allow the vacuum to extract through the vacuum vent unwanted fluid present in the filter zone.

In one embodiment of the multiple-screw extruder, the material introduced at the second feed location includes material acting as particulate filler to the molten polymeric material in the filter zone, and the unwanted fluid present in the filter zone includes air, and the extraction of air performs significant densification of the particulate filler.

In a second embodiment of the multiple-screw extruder, the material introduced at the second feed location includes moisture-containing material, and the unwanted fluid extracted through the vacuum vent includes moisture removed from the moisture-containing material.

In a third embodiment of the multiple screw extruder, the material introduced at the second feed location includes liquid delivered to mix with the molten polymeric material in the filter zone, and the unwanted fluid extracted through the vacuum vent includes a residual amount of the liquid delivered.

The disclosed thermally controlled extruder that includes multiple concatenated barrel segments defining a longitudinal axis and multiple rotatable extruder screws configured to mix material introduced into the extruder can be used to carry out a method of forming, at a high rate of throughput, a compound including polymeric material and particulate filler material mixed by operation of the thermally controlled extruder without appreciable vacuum vent removal of the particulate filler material from the extruder.

The method entails introducing polymeric material in a first feed location associated with a first opening formed in a first barrel segment of the extruder. The polymeric material is processed by rotation of the multiple extruder screws to form a flow of molten polymeric material. A section of each of the multiple extruder screws has lengthwise mixing elements, and the sections of the multiple extruder screws function as a filter zone. The method entails also introducing particulate filler material in a second feed location associated with a second opening formed in a second barrel segment of the extruder. The second barrel segment is positioned downstream of the first barrel segment so that the multiple extruder screws mix the particulate filler material with the flow of molten polymeric material. The method entails also applying vacuum to a vacuum vent associated with a vent opening in a third barrel segment that is positioned between the first and second feed locations. The mixing elements functioning as a filter zone are located between the vacuum vent and the second opening associated with the second feed location. The mixing elements of the filter zone cooperate to allow the flow of molten polymeric material to move along the longitudinal axis of the extruder and prevent the vacuum from drawing through the vacuum vent an appreciable amount of the particulate filler material introduced at the second feed location and to extract air present in the filter zone to thereby perform significant densification of the particulate filler as the multiple extruder screws rotate to form a compound including the densified particulate filler material mixed with the flow of molten polymeric material.

The disclosed thermally controlled extruder that includes multiple concatenated barrel segments defining a longitudinal axis and multiple rotatable extruder screws configured to mix material introduced into the extruder can be used to carry out a method of extracting unwanted fluid present during operation of the thermally controlled extruder that forms a compound by mixing polymeric material with added material.

The method entails introducing a first amount of polymeric material in a first feed location associated with a first opening formed in a first barrel segment of the extruder. The first amount of polymeric material is processed by rotation of the multiple extruder screws to form a flow of molten polymeric material. The method entails also introducing a second amount of polymeric material or a combination of added material and a second amount of polymeric material in a second feed location associated with a second opening formed in a second barrel segment of the extruder. The second barrel segment is positioned downstream of the first barrel segment so that the multiple extruder screws mix the second amount of polymeric material or the combination of the added material and the second amount of polymeric material with the flow of molten polymeric material. The method entails also applying vacuum to a vacuum vent associated with a vent opening in a third barrel segment that is positioned between the first and second feed locations. Each of the multiple extruder screws has a first polymer flow sealing zone section located between the first barrel segment and the vent opening in the third barrel segment, a filter zone section located between the vacuum vent and the second opening associated with the second feed location, and a second polymer flow sealing zone section located downstream of the second opening associated with the second feed location. The first polymer flow sealing zone sections, the filter zone sections, and the second polymer flow sealing zone sections of the multiple extruder screws function as, respectively, a first polymer flow sealing zone, a filter zone, and a second polymer flow sealing zone. The filter zone includes lengthwise mixing elements that allow the flow of molten polymeric material to move along the longitudinal axis of the extruder, prevent the vacuum from drawing through the vacuum vent an appreciable amount of any added material introduced at the second feed location, and allow the vacuum to extract through the vacuum vent unwanted fluid present between the first and second polymer flow sealing zones. The first and second polymer flow sealing zones prevent loss of vacuum resulting from air entering the extruder from locations other than the second feed location.

Additional aspects and advantages will be apparent from the following detailed description of preferred embodiments, which proceeds with reference to the accompanying drawings.

DETAILED DESCRIPTION OF PREFERRED EMBODIMENTS

Figure 2:
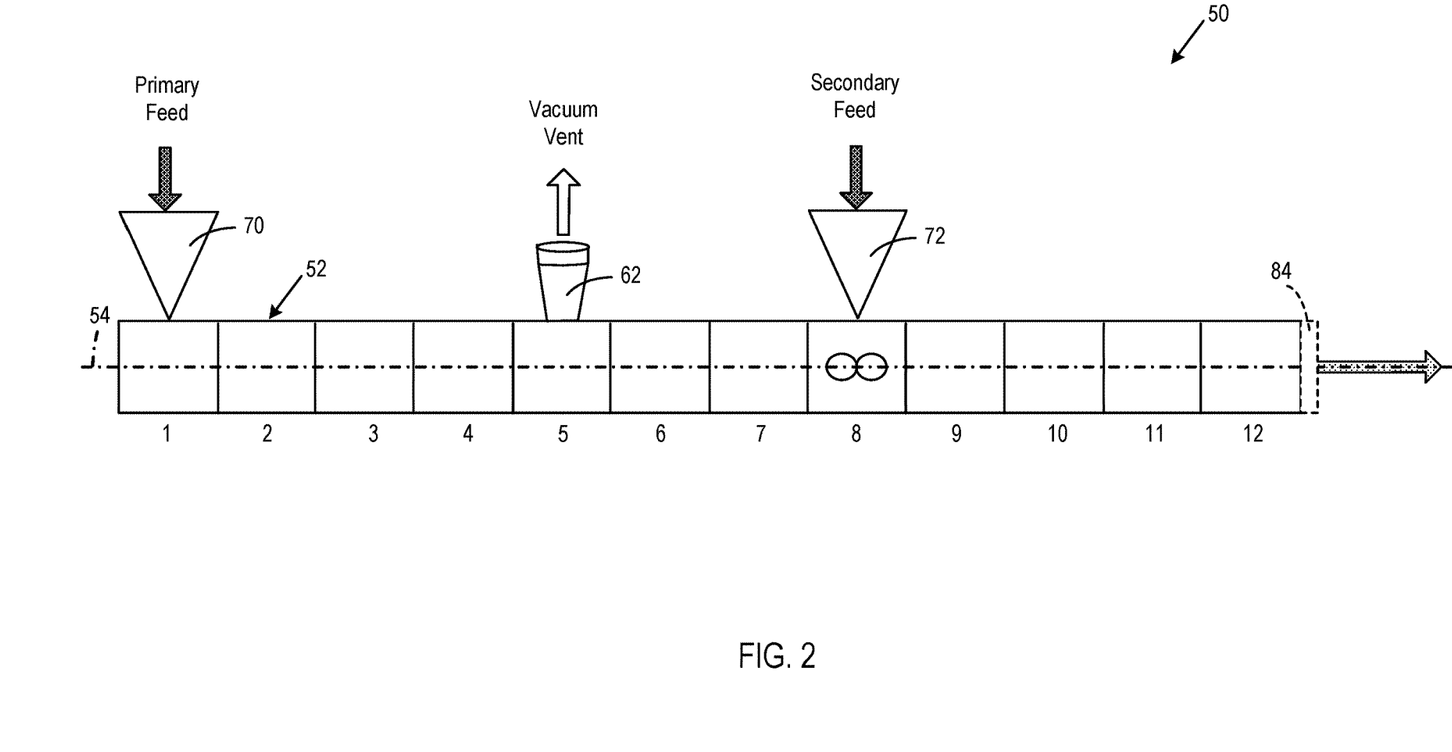
FIG. 2 is a simplified diagram of a preferred embodiment of a thermally controlled multiple screw extruder that implements the disclosed vacuum feed technology to form, at a high rate of throughput, an extrudate of densified particulate filler material mixed with a flow of molten polymeric material.
Figure 3:
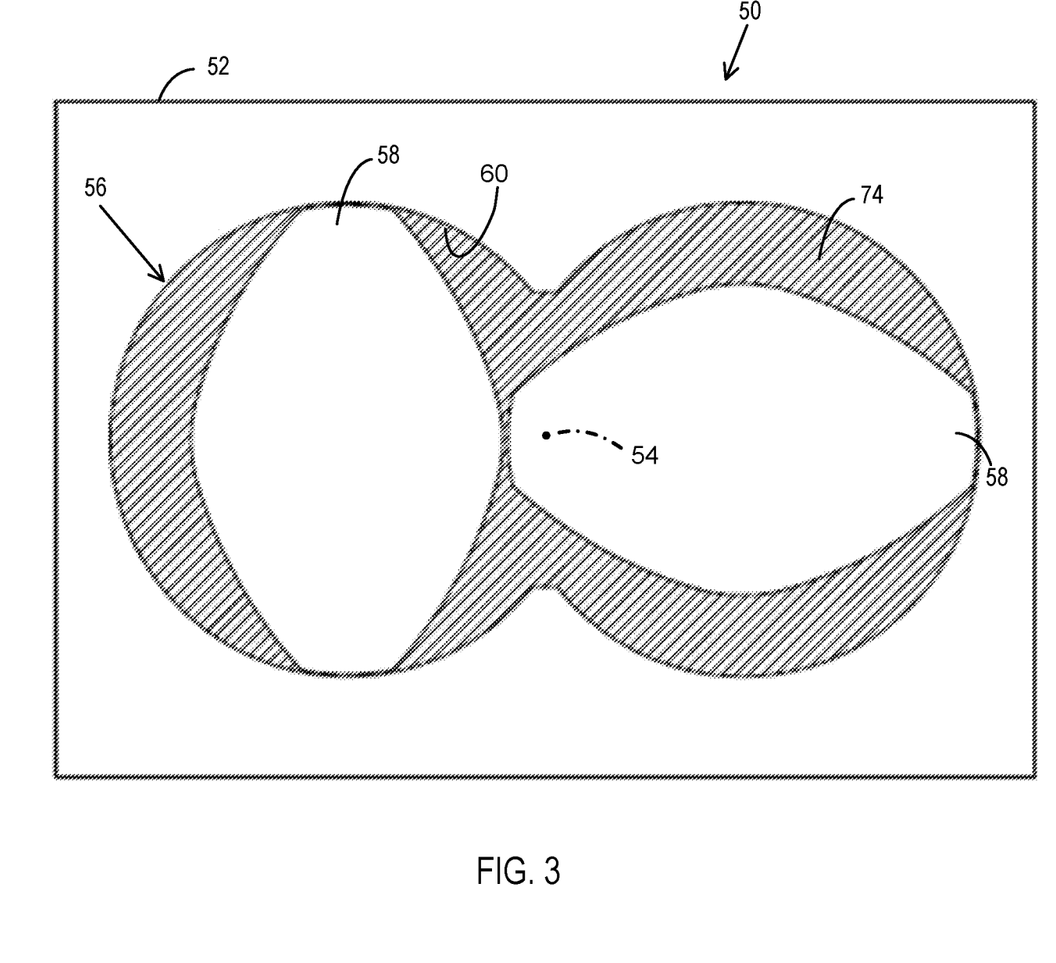
FIG. 3 is an enlarged cross-sectional view of the axially spaced-apart co-rotating extruder screws contained in the interior of the multiple screw extruder of FIG. 2.
Figure 4:
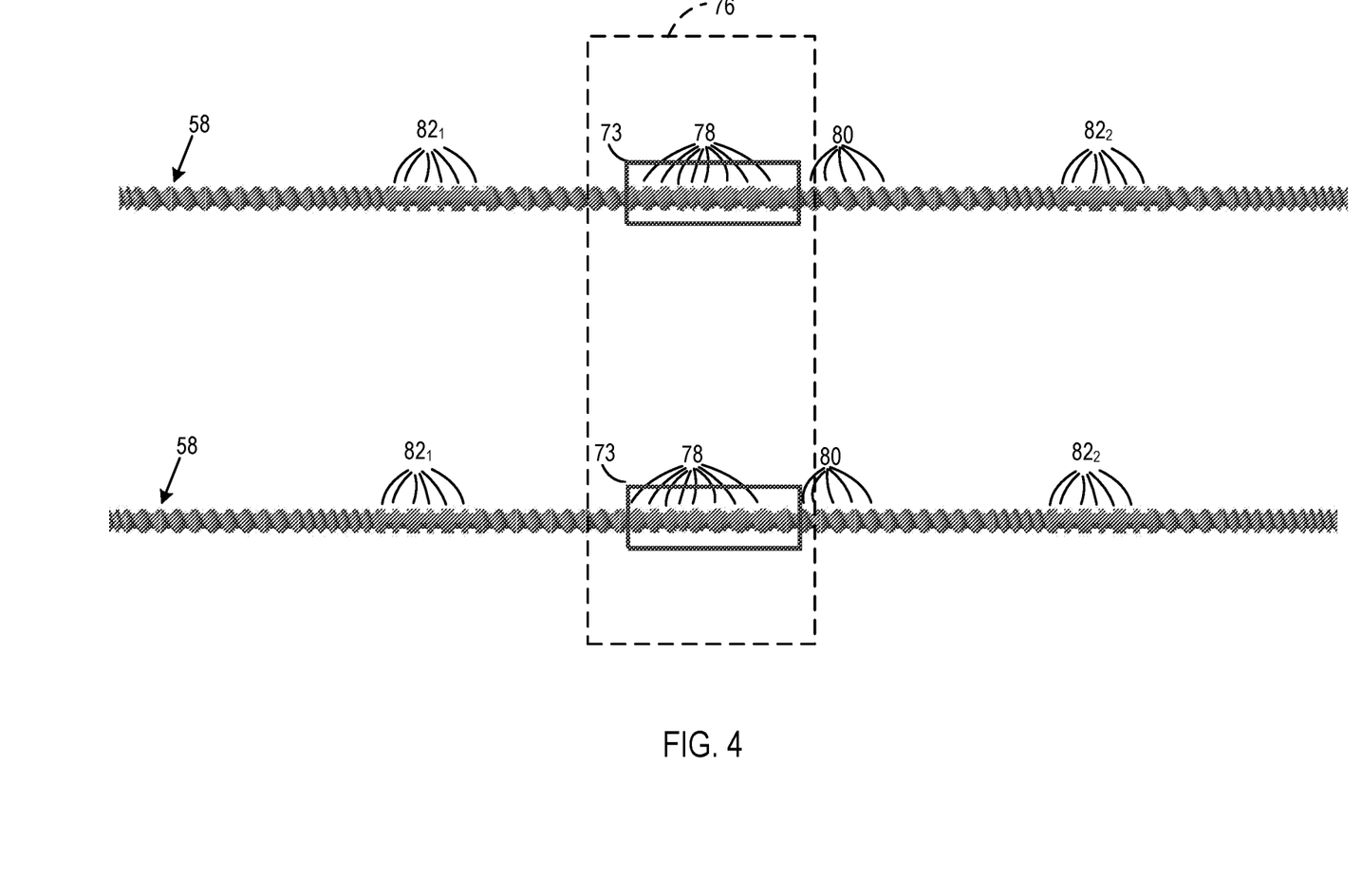
FIG. 4 is a diagram of the extruder screws, shown spaced apart from each other and outside of the barrel of the extruder of FIG. 2.

FIG. 2 is a simplified diagram showing, as a preferred embodiment, a co-rotating twin screw extruder 50 formed with a thermally controlled extruder barrel 52 that includes multiple concatenated barrel segments, numbered 1-12. Barrel segment numbers in ascending order indicate barrel segments that are farther downstream along extruder 50. Barrel segments 1-12 define a longitudinal axis 54 and an interior 56 of extruder barrel 52. FIG. 3 shows axially spaced-apart rotatable extruder screws 58 extending through interior 56 of extruder barrel 52, which exhibits a figure-eight profile and has an interior surface 60. FIG. 4 shows the two extruder screws 58, outside of barrel 52. Extruder screws 58 are of the same design and intermesh with each other to effect co-rotation during extruder operation. Extruder 50 is constructed with a vacuum vent 62 and extruder screws 58 designed and placed in accordance with the disclosed configuration.

Thermal control of extruder barrel 52 maintains the individual barrel segments 2-12 at temperature set points. Barrel segment 1 is typically not heated, and heating and cooling processes are performed at each of barrel segments 2-12.

Materials including polymeric materials are introduced into co-rotating extruder screws 58 of extruder 50 through an opening located at barrel segment 1 for a primary feed 70. Materials are also introduced through an opening located at barrel segment 8 for a secondary feed 72 downstream of the opening for primary feed 70. Secondary feed 72 is attached and sealed by a gasket to the side surface of extruder barrel segment 8 with an opening to allow secondary feed 72 to force the material into the side of extruder 50. Vacuum is applied to an opening in extruder 50 for passage through vacuum vent 62. The opening for vacuum vent 62 is located between the opening for primary feed 70 and the opening for secondary feed 72. The applied vacuum increases the density of the material introduced at the opening for secondary feed 72. The applied vacuum also removes so-called volatiles, such as air or moisture, from materials introduced at the location of secondary feed 72.

A section 73 of each extruder screw 58 located between vacuum vent 62 and the opening for secondary feed 72 is configured in such a way that the polymeric materials introduced at primary feed 70 do not completely fill a free volume 74 in the space between screws 58 and interior surface 60 of barrel 52 so as to not form a dynamic seal. Section 73 of each extruder screw 58 is also configured in such a way that vacuum applied through vacuum vent 62 between the openings for primary feed 70 and secondary feed 72 extracts at most a very small percentage of the materials introduced into extruder 50 through the opening for secondary feed 72. Sections 73 of extruder screws 58 function together as a filter zone 76, which is identified in FIG. 4 by a broken-line rectangular box around sections 73. Each section 73 of filter zone 76 is configured with mixing elements, for example, kneading disks 78, that have a forward convey helix angle.

Filter zone 76 is a region inside extruder barrel 52 in which the molten polymer flows downstream in the path of vacuum and mixing elements 78 to catch and mix with the material fed at the opening for secondary feed 72. Mixing elements 78 prevent the flow of molten polymeric material from filling free volume 74 so as to not form a dynamic seal and allow extraction of unwanted fluid present in filter zone 76. The rotation of mixing elements 78 in filter zone 76 results in turbulent molten polymeric material that randomly contacts interior surface 60 of extruder barrel 52. The turbulent molten polymeric material catches most of the particulate filler material but leaves sufficient free volume gaps to allow unwanted fluid to pass through filter zone 76 and exit vacuum vent 62. In this embodiment, filter zone 76 is positioned between vacuum vent 62 at barrel segment 5 and secondary feed 72 at barrel segment 8 when screws 58 are set in extruder barrel 52. This configuration of mixing elements 78 will not form a dynamic seal with the materials introduced at the locations of primary feed 70 and secondary feed 72.

FIG. 4 shows outside of filter zone 76 conveying elements 80 that move the mixed material through extruder 50 and mixing elements, for example, neutral kneading disks 82₁ that act as a dam and thereby form a dynamic seal outside of filter zone 76. Mixing elements 82₁ are positioned downstream of primary feed 70 at barrel segment 1 and upstream of filter zone 76 to prevent vacuum from drawing through vacuum vent 62 an appreciable amount of material fed into extruder 50 at the opening for primary feed 70. Mixing elements 82₁ are preferably located at barrel segment 4 when screws 58 are set in extruder barrel 52. Any type of extruder screw element that forms a dynamic seal may not be used in filter zone 76 sections of extruder screws 58. The number of mixing elements and the length of filter zone 76 may vary based on the bulk density of the material fed into extruder 50 at the opening for secondary feed 72 and on the properties of polymer fed into extruder 50 at the opening for primary feed 70. If filter zone 76 of mixing elements is too short for a given type of material fed at the opening for secondary feed 72 and the opening for primary feed 70, the material fed at the opening for secondary feed 72 would be extracted through vacuum vent 62 and into a vacuum system (not shown). A zone of densification, which encompasses filter zone 76 and extends to secondary feed 72, is the region where air, but not the material fed at the opening for secondary feed 72, is extracted out of interior 56 of extruder barrel 52 to densify the mixture of molten polymer and material flowing there through.

Secondary feed 72 located at the secondary feed opening could be designed to be air tight to optimize extraction of air from the materials introduced at the opening for secondary feed 72. A second dynamic seal filling free volume 74 prevents loss of vacuum at vacuum vent 62 and from air entering extruder 50 from locations other than secondary feed 72. The second dynamic seal may be implemented as mixing elements $82_2$ of, for example, the same type as that of mixing elements $82_1$, or a restriction such as a die 84 positioned at the extrudate discharge end of barrel segment 12. Die 84 restricts the flow of molten compound material, causing it to back up and create a seal.

The following example describes a preferred length of filter zone 76 filled with mixing elements 78 (forward helix mixing elements) of extruder screw 58 for mixing molten polymer and a specified talc mineral.

Example

Secondary feed 72 receives IMI Fabi Talc HTP1 material having a bulk density of 0.26 g/cm$^3$, median particle size diameter $D_{50}$ of 1.9 μm, and top cut $D_{98}$ of 8.0 μm. Each of extruder screws 58 has a length, l, and a diameter, d. This particular talc powder material is filtered well by filter zone 76 mixing elements of extruder screws 58 (l/d=48:1), each of which having in filter zone 76 a minimum l/d=4:1 and a maximum l/d=8:1 of forward helix mixing elements. This range of l/d ratios prevents large quantities of talc mineral powder introduced at secondary feed 72 to be drawn into the vacuum pump system and achieves desired densification of the talc mineral powder. The l/d ratio is determined by the powder material particle size and corresponding amounts of entrained air. The l/d range of filter zone 76 from about 4:1 to about 8:1 varies, based on the chemical composition, particle size distribution, and physical properties of the powdered material introduced at secondary feed 72 and the properties of the polymeric material introduced at primary feed 70.

In general, an l/d ratio of filter zone 76 is within a range of operation of between about 0.25:1 and about 12:1.

Figure 5:
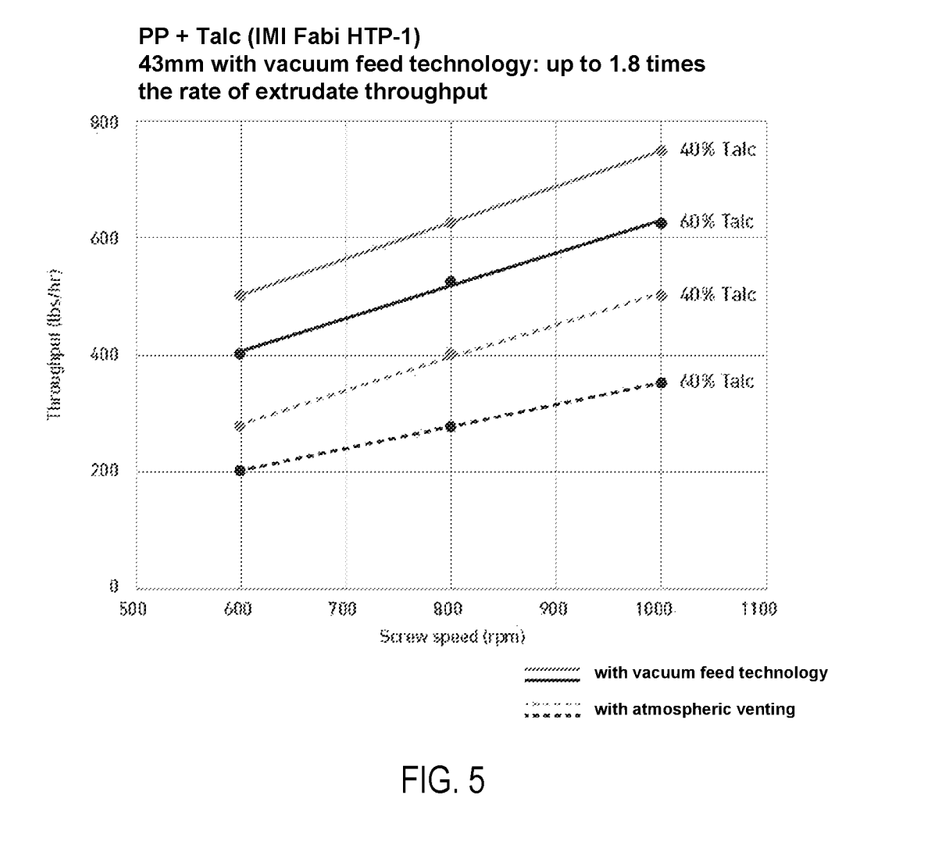
FIG. 5 is a graph showing an increase in rate of extrudate throughput of polypropylene mixed with talc mineral achieved by implementation of the disclosed vacuum feed technology as compared with that achieved by implementation of atmospheric venting in the conventionally configured extruder of FIG. 1.

FIG. 5 is a graph showing, for various extruder rotational screw speeds and two different amounts of talc mineral, an improvement in extrudate throughput achieved by the disclosed vacuum feed technology implemented as shown in FIGS. 2, 3, and 4 over the prior art atmospheric venting implemented as shown in FIG. 1. The data shown in FIG. 5 were generated by mixing polypropylene and IMI Fabi Talc HTP-1. These materials were mixed by 2064-mm long, 43-mm diameter co-rotating twin extruder screws with vacuum applied to vacuum vent 62, creating an absolute pressure of about 13,500 Pa (135 millibar). The applied vacuum densified the talc powder introduced into the extruder. The increase in bulk density of talc powder in the molten polymeric material resulted in moving more material through the extruder in a given unit of time and a consequent reduction in conversion cost. The data show production of an extrudate at a rate of up to 1.8 times the rate of extrudate throughput achieved with use of an extruder conventionally configured to use atmospheric venting.

Acceptable densification of powder can be achieved by application of vacuum creating an absolute pressure of no more than about 67,500 Pa (675 millibar).

It is unusual for a vacuum vent and secondary feed to be used in the combination described with reference to FIG. 2. It is conventional for a vacuum vent to be placed at an extruder barrel opening between the secondary feed opening (e.g., at the location of barrel segment 10 or 11 as shown in FIG. 1B) and the discharge end of the extruder. But when the vacuum vent is used in the described configuration shown in FIG. 2, mixing elements that form a dynamic seal, for example, mixing elements $82_1$ or $82_2$, would be intentionally included in filter zone 76 sections of the extruder screws located in the barrel segments between the openings for the vacuum vent and secondary feed. This conventional arrangement would form a dynamic seal to prevent materials from being extracted from the secondary feed opening into the vacuum system.

Skilled persons will appreciate that the configuration of the sections of extruder screws 58 in filter zone 76 between the opening for vacuum vent 62 and the opening for secondary feed 72 may be optimized for extraction of gas, which is primarily air. The distance between the opening for vacuum vent 62 and the opening for secondary feed 72 may also be optimized.

Figure 6:
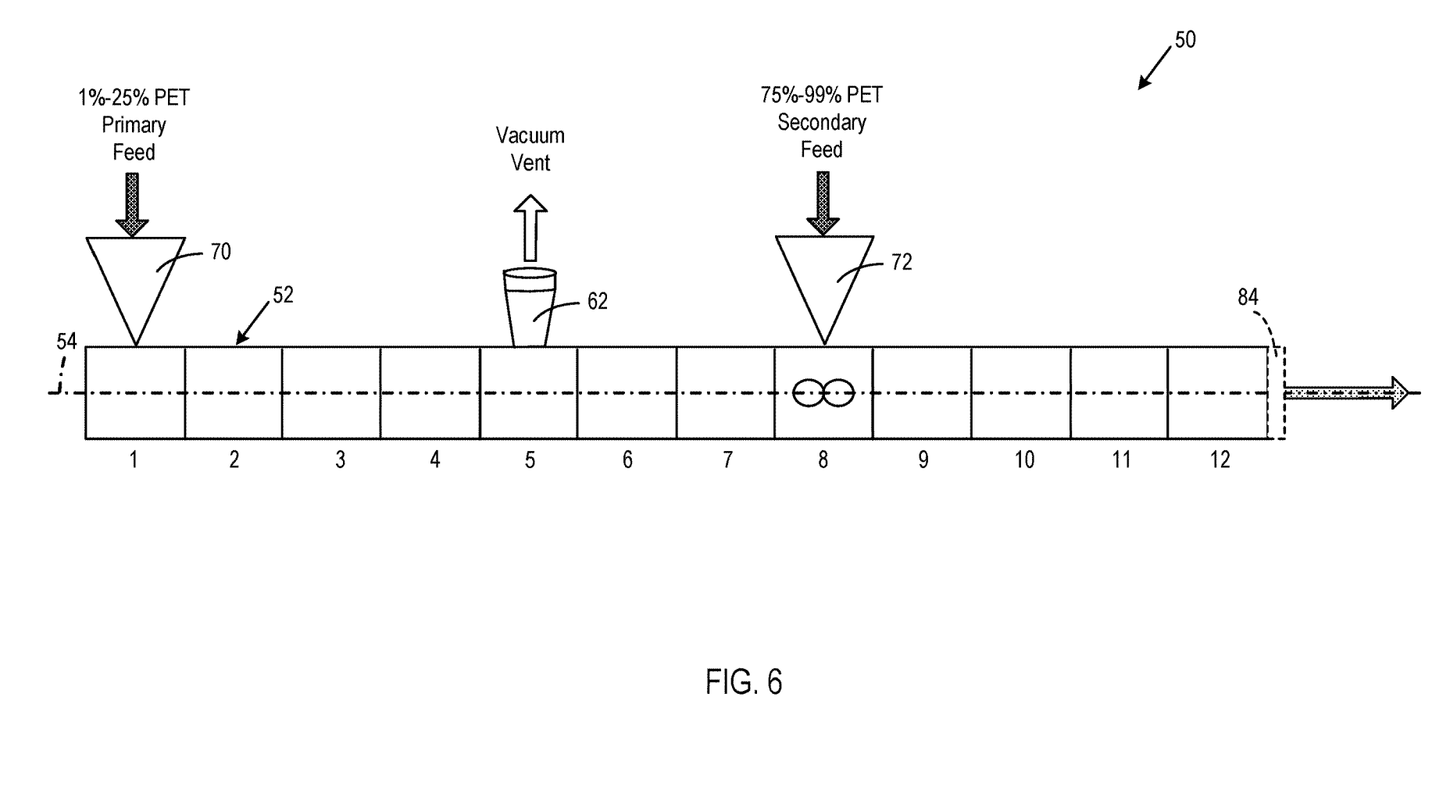
FIG. 6 is a simplified diagram of a preferred embodiment of a thermally controlled multiple screw extruder that implements the disclosed vacuum feed technology to extract unwanted fluid from material introduced into a feed location and mixed with a flow of molten polymeric material.

FIG. 6 is a reproduction of FIG. 2 presented for use in describing fluid extraction processes in which extruder 50, including extruder screws 58 designed and configured as shown in and described with reference to FIGS. 3 and 4, extracts unwanted fluid present during operation of extruder 50 forming a compound by mixing a flow of molten polymeric material with added material or with a combination of added material and a second amount of polymer material introduced at secondary feed 72. In one fluid extraction process, which is described below, extruder 50 is used as a drying chamber for polyethylene terephthalate (PET) polymer as it is being melted and processed.

With reference to FIG. 6, about 1 wt. % to about 25 wt. % of PET polymer is introduced through the opening for primary feed 70, which defines a first feed location. This first amount of PET polymer introduced at barrel segment 1 melts to form a first dynamic seal by operation of mixing elements $82_1$ included in a first polymer flow sealing zone positioned between primary feed 70 at barrel segment 1 and the opening for vacuum vent 62 at barrel segment 5. The moisture content of the first amount of PET polymer is of minimal significance in the PET polymer drying process. The first polymer flow sealing zone prevents vacuum from drawing into vacuum vent 62 the polymeric material introduced at the opening for primary feed 70. The remainder of about 75 wt. % to about 99 wt. % PET polymer contains some moisture and is introduced through the opening for secondary feed 72, which defines a second feed location. The PET polymer can be in powder, flake, or pellet form. Other than polymer, added particulate filler material can be introduced at secondary feed 72. Such particulate material may be, for example, wood flour, which contains about 8% moisture and from which moisture is drawn into vacuum vent 62, or talc mineral, from which, in comparison, mostly air is drawn into vacuum vent 62.

Vacuum applied to the vent opening in extruder 50 for passage through vacuum vent 62 draws the moisture out of and therefore dries the PET polymer delivered through secondary feed 72. The mixing elements of filter zone 76 catch the material fed at the opening for secondary feed 72 and mix with material flowing in extruder barrel 52. The mixing elements of filter zone 76 do not form a dynamic seal, as described above with reference to FIG. 4. A second polymer flow sealing zone formed downstream of secondary feed 72 at barrel segment 8 prevents loss of vacuum occurring at filter zone 76 and from air entering extruder 50 from locations other than the opening for secondary feed 72. The second polymer flow sealing zone may be formed by operation of mixing elements $82_2$ positioned between secondary feed 72 at barrel segment 8 and one of the barrel segments (e.g., barrel segment 10 or 11) located proximal to but downstream of secondary feed 72. The second polymer flow sealing zone may optionally be formed by a restriction of material flow in extruder barrel 52, such as die 84 positioned at the extrudate discharge end of the terminal barrel segment 12.

The efficacy of extruder 50 in performing densification of material, and extraction of unwanted fluid, introduced at secondary feed 72 is achieved in part by use of the first polymer flow sealing zone formed between primary feed 70 and vacuum vent 62 and the second polymer flow sealing zone formed at a location downstream of secondary feed 72. The first and second polymer flow sealing zones prevent loss of vacuum resulting from air entering extruder 50 from locations other than the second feed location.

Skilled persons will appreciate that the polymeric material introduced through the opening for primary feed 70 need not include the same polymer as that included in the polymeric material introduced through the opening for secondary feed 72. The amount of polymeric material introduced through the opening for primary feed 70 need not be a sacrificial, i.e., small, amount of polymer, so long as it does not exhibit appreciable moisture content that would result in hydrolysis of the flow of polymeric material through extruder 50.

It will be obvious to those having skill in the art that many changes may be made to the details of the above-described embodiments without departing from the underlying principles of the disclosed extruder and method of extracting volatiles. For example, although intended for plastics extrusion, extruder 50 could be applied to food and other extrusion processes in which co-rotating twin screw extruders are used. The disclosed configuration of extruder 50 could be used for all co-rotating twin screw extruder sizes. The scope of the present invention should, therefore, be determined only by the following claims.

The invention claimed is:

1. A multiple-screw extruder implemented with a vacuum vent positioned between spaced-apart material feed locations of an extruder barrel to facilitate densification of material introduced into a material feed location that is downstream of the vacuum vent, extraction of unwanted fluid from material introduced into the extruder, or both, the extruder comprising:

a thermally controlled extruder barrel including multiple concatenated barrel segments defining a longitudinal axis and an interior of the extruder barrel through which multiple axially spaced-apart extruder screws extend, the interior of the extruder barrel having an interior surface;

a first feed location associated with a first opening formed in a first barrel segment of the multiple concatenated barrel segments, and a second feed location associated with a second opening formed in a second barrel segment of the multiple concatenated barrel segments, the second barrel segment positioned downstream of the first barrel segment;

a vacuum vent associated with a vent opening formed in a third barrel segment of the multiple concatenated barrel segments and positioned between the first and second feed locations, and the vacuum vent configured to apply vacuum to the vent opening in the third barrel segment for passage through the vacuum vent to a free volume between the interior surface of the extruder barrel and a section of each of the multiple extruder screws, the sections of the multiple extruder screws functioning as a filter zone; and each section of the multiple extruder screws of the filter zone having lengthwise mixing elements located between the vacuum vent and the second opening associated with the second feed location, the section of each of the multiple extruder screws having a diameter, d, a length, l, and an l/d ratio within a range of between about 0.25:1 and about 12:1, the mixing elements of the filter zone configured to allow polymeric material introduced at the first feed location to flow as molten polymeric material through the filter zone along the longitudinal axis of the extruder barrel and to capture material introduced at the second feed location so as to prevent the vacuum from drawing through the vacuum vent an appreciable amount of the material, and the mixing elements of the filter zone configured to prevent the flow of molten polymeric material from completely filling the free volume between the extruder screws and the interior surface of the extruder barrel so as not to form a dynamic seal and thereby allow the vacuum to extract through the vacuum vent unwanted fluid present in the filter zone.

2. The multiple-screw extruder of claim 1, in which the material introduced at the second feed location includes material acting as particulate filler to the molten polymeric material in the filter zone, the unwanted fluid present in the filter zone includes air, and the extraction of air performs significant densification of the particulate filler.

3. The multiple-screw extruder of claim 1, in which the mixing elements of the filter zone includes mixing elements configured in a forward helical extension.

4. The multiple-screw extruder of claim 1, in which the multiple axially spaced-apart extruder screws include twin co-rotating screws.

5. The multiple-screw extruder of claim 1, in which the material introduced at the second feed location includes powder material acting as a particulate filler to the molten polymeric material.

6. The multiple-screw extruder of claim 5, in which the powder material includes talc mineral.

7. A multiple-screw extruder implemented with a vacuum vent positioned between spaced-apart material feed locations of an extruder barrel to facilitate densification of material introduced into a material feed location that is downstream of the vacuum vent, extraction of unwanted fluid from material introduced into the extruder, or both, the extruder comprising:

a thermally controlled extruder barrel including multiple concatenated barrel segments defining a longitudinal axis and an interior of the extruder barrel through which multiple axially spaced-apart extruder screws extend, the interior of the extruder barrel having an interior surface;

a first feed location associated with a first opening formed in a first barrel segment of the multiple concatenated barrel segments, and a second feed location associated with a second opening formed in a second barrel segment of the multiple concatenated barrel segments, the second barrel segment positioned downstream of the first barrel segment;

a vacuum vent associated with a vent opening formed in a third barrel segment of the multiple concatenated barrel segments and positioned between the first and second feed locations, and the vacuum vent configured to apply vacuum to the vent opening in the third barrel segment for passage through the vacuum vent to a free volume between the interior surface of the extruder barrel and a section of each of the multiple extruder screws, the vacuum applied to the vent opening creating an absolute pressure of no more than about 67,500 Pa (675 millibar), and the sections of the multiple extruder screws functioning as a filter zone; and each section of the multiple extruder screws of the filter zone having lengthwise mixing elements located between the vacuum vent and the second opening associated with the second feed location, the mixing elements of the filter zone configured to allow polymeric material introduced at the first feed location to flow as molten polymeric material through the filter zone along the longitudinal axis of the extruder barrel and to capture material introduced at the second feed location so as to prevent the vacuum from drawing through the vacuum vent an appreciable amount of the material, and the mixing elements of the filter zone configured to prevent the flow of molten polymeric material from completely filling the free volume between the extruder screws and the interior surface of the extruder barrel so as not to form a dynamic seal and thereby allow the vacuum to extract through the vacuum vent unwanted fluid present in the filter zone.

8. A multiple-screw extruder implemented with a vacuum vent positioned between spaced-apart material feed locations of an extruder barrel to facilitate densification of material introduced into a material feed location that is downstream of the vacuum vent, extraction of unwanted fluid from material introduced into the extruder, or both, the extruder comprising:

a thermally controlled extruder barrel including multiple concatenated barrel segments defining a longitudinal axis and an interior of the extruder barrel through which multiple axially spaced-apart extruder screws extend, the interior of the extruder barrel having an interior surface;

a first feed location associated with a first opening formed in a first barrel segment of the multiple concatenated barrel segments, and a second feed location associated with a second opening formed in a second barrel segment of the multiple concatenated barrel segments, the second barrel segment positioned downstream of the first barrel segment;

a vacuum vent associated with a vent opening formed in a third barrel segment of the multiple concatenated barrel segments and positioned between the first and second feed locations, and the vacuum vent configured to apply vacuum to the vent opening in the third barrel segment for passage through the vacuum vent to a free volume between the interior surface of the extruder barrel and a section of each of the multiple extruder screws, the sections of the multiple extruder screws functioning as a filter zone; and each section of the multiple extruder screws of the filter zone having lengthwise mixing elements located between the vacuum vent and the second opening associated with the second feed location, the mixing elements of the filter zone configured to allow polymeric material introduced at the first feed location to flow as molten polymeric material through the filter zone along the longitudinal axis of the extruder barrel and to capture material, including moisture-containing material, introduced at the second feed location so as to prevent the vacuum from drawing through the vacuum vent an appreciable amount of the material, and the mixing elements of the filter zone configured to prevent the flow of molten polymeric material from completely filling the free volume between the extruder screws and the interior surface of the extruder barrel so as not to form a dynamic seal and thereby allow the vacuum to extract through the vacuum vent unwanted fluid including moisture removed from the moisture-containing material present in the filter zone.

9. A multiple-screw extruder implemented with a vacuum vent positioned between spaced-apart material feed locations of an extruder barrel to facilitate densification of material introduced into a material feed location that is downstream of the vacuum vent, extraction of unwanted fluid from material introduced into the extruder, or both, the extruder comprising:

a thermally controlled extruder barrel including multiple concatenated barrel segments defining a longitudinal axis and an interior of the extruder barrel through which multiple axially spaced-apart extruder screws extend, the interior of the extruder barrel having an interior surface;

a first feed location associated with a first opening formed in a first barrel segment of the multiple concatenated barrel segments, and a second feed location associated with a second opening formed in a second barrel segment of the multiple concatenated barrel segments, the second barrel segment positioned downstream of the first barrel segment;

a vacuum vent associated with a vent opening formed in a third barrel segment of the multiple concatenated barrel segments and positioned between the first and second feed locations, and the vacuum vent configured to apply vacuum to the vent opening in the third barrel segment for passage through the vacuum vent to a free volume between the interior surface of the extruder barrel and a section of each of the multiple extruder screws, the sections of the multiple extruder screws functioning as a filter zone; and each section of the multiple extruder screws of the filter zone having lengthwise mixing elements located between the vacuum vent and the second opening associated with the second feed location, the mixing elements of the filter zone configured to allow polymeric material introduced at the first feed location to flow as molten polymeric material through the filter zone along the longitudinal axis of the extruder barrel and to capture material introduced at the second feed location including liquid delivered to mix with the molten polymeric material in the filter zone so as to prevent the vacuum from drawing through the vacuum vent an appreciable amount of the material, and the mixing elements of the filter zone configured to prevent the flow of molten polymeric material from completely filling the free volume between the extruder screws and the interior surface of the extruder barrel so as not to form a dynamic seal and thereby allow the vacuum to extract through the vacuum vent unwanted fluid including a residual amount of the liquid delivered to and present in the filter zone.

10. A method of forming, at a high rate of throughput, a compound including polymeric material and particulate filler material mixed by operation of a thermally controlled extruder without appreciable vacuum vent removal of the particulate filler material from the extruder, the extruder including multiple concatenated barrel segments defining a longitudinal axis and multiple rotatable extruder screws configured to mix material introduced into the extruder, comprising:

introducing polymeric material in a first feed location associated with a first opening formed in a first barrel segment of the extruder, the polymeric material processed by rotation of the multiple extruder screws to form a flow of molten polymeric material, a section of each of the multiple extruder screws having lengthwise mixing elements, a diameter, d, a length, l, and an l/d ratio within a range of between about 0.25:1 and about 12:1, and the sections of the multiple extruder screws functioning as a filter zone;

introducing particulate filler material in a second feed location associated with a second opening formed in a second barrel segment of the extruder, the second barrel segment being positioned downstream of the first barrel segment so that the multiple extruder screws mix the particulate filler material with the flow of molten polymeric material; and     applying vacuum to a vacuum vent associated with a vent opening in a third barrel segment that is positioned between the first and second feed locations, the mixing elements functioning as a filter zone being located between the vacuum vent and the second opening associated with the second feed location, and the mixing elements of the filter zone cooperating to allow the flow of molten polymeric material to move along the longitudinal axis of the extruder and prevent the vacuum from drawing through the vacuum vent an appreciable amount of the particulate filler material introduced at the second feed location and to extract air present in the filter zone to thereby perform significant densification of the particulate filler as the multiple extruder screws rotate to form a compound including the densified particulate filler material mixed with the flow of molten polymeric material.

11. The method of claim 10, in which the mixing elements of the filter zone includes mixing elements configured in a forward helical extension.

12. The method of claim 10, in which the multiple extruder screws include twin co-rotating screws.

13. The method of claim 10, in which the particulate filler includes powder material.

14. The method of claim 13, in which the powder material includes talc mineral.

15. A method of extracting unwanted fluid present during operation of a thermally controlled extruder forming a compound by mixing polymeric material with added material, the extruder including multiple concatenated barrel segments defining a longitudinal axis and multiple rotatable extruder screws configured to mix material introduced into the extruder, comprising:

introducing a first amount of polymeric material in a first feed location associated with a first opening formed in a first barrel segment of the extruder, the first amount of polymeric material processed by rotation of the multiple extruder screws to form a flow of molten polymeric material;

introducing a second amount of polymeric material or a combination of added material and a second amount of polymeric material in a second feed location associated with a second opening formed in a second barrel segment of the extruder, the second barrel segment being positioned downstream of the first barrel segment so that the multiple extruder screws mix the second amount of polymeric material or the combination of the added material and the second amount of polymeric material with the flow of molten polymeric material; and     applying vacuum to a vacuum vent associated with a vent opening in a third barrel segment that is positioned between the first and second feed locations, each of the multiple extruder screws having a first polymer flow sealing zone section located between the first barrel segment and the vent opening in the third barrel segment, a filter zone section located between the vacuum vent and the second opening associated with the second feed location, and a second polymer flow sealing zone section located downstream of the second opening associated with the second feed location, the first polymer flow sealing zone sections, the filter zone sections, and the second polymer flow sealing zone sections of the multiple extruder screws functioning as, respectively, a first polymer flow sealing zone, a filter zone, and a second polymer flow sealing zone, the filter zone including lengthwise mixing elements that allow the flow of molten polymeric material to move along the longitudinal axis of the extruder, prevent the vacuum from drawing through the vacuum vent an appreciable amount of any added material introduced at the second feed location, and allow the vacuum to extract through the vacuum vent unwanted fluid present between the first and second polymer flow sealing zones, and the first and second polymer flow sealing zones preventing loss of vacuum resulting from air entering the extruder from locations other than the second feed location.

16. The method of claim 15, in which the mixing elements in the filter zone includes mixing elements configured in a forward helical extension.

17. The method of claim 15, in which the filter zone section of each of the multiple extruder screws has a diameter, d, and a length, l, and in which an l/d ratio of the filter zone is within a range of between about 0.25:1 and about 12:1.

18. The method of claim 15, in which the first polymer flow sealing zone comprises mixing elements that include neutral kneading disks.

19. The method of claim 18, in which the first polymer flow sealing zone further comprises mixing elements that include reverse helix extended convey elements.

20. The method of claim 15, in which the first polymer flow sealing zone comprises mixing elements that include reverse helix extended convey elements.

21. The method of claim 15, in which a die is positioned at a terminal barrel segment of the extruder, and in which the die is included in the second polymer flow sealing zone that prevents loss of vacuum.

22. The method of claim 15, in which the second polymer flow sealing zone comprises mixing elements that include neutral kneading disks.

23. The method of claim 22, in which the second polymer flow sealing zone further comprises mixing elements that include reverse helix extended convey elements.

24. The method of claim 15, in which the second polymer flow sealing zone comprises mixing elements that include reverse helix extended convey elements.

25. The method of claim 15, in which the second polymer flow sealing zone includes a flow restriction that prevents loss of vacuum.

26. The method of claim 15, in which the first and second amounts of polymeric material include different polymers.

27. The method of claim 15, in which the first and second amounts of polymeric material include the same polymer.

28. The method of claim 27, in which the polymer is polyethylene terephthalate (PET).

29. The method of claim 28, in which the first amount of polymeric material is from about 1 wt. % to about 25 wt. % PET and the second amount of polymeric material is from about 75 wt. % to about 99 wt. % PET.

30. The method of claim 15, in which the added material introduced at the second feed location includes moisture-containing material, and in which the unwanted fluid extracted through the vacuum vent includes moisture removed from the moisture-containing material.

31. The method of claim 15, in which the added material introduced at the second feed location includes liquid delivered to mix with the molten polymeric material in the filter zone, and in which the unwanted fluid extracted through the vacuum vent includes a residual amount of the liquid delivered.

* * * * *